United States Patent
Poess (10) Patent No.: US 11,474,861 B1
(45) Date of Patent: Oct. 18, 2022

(54) METHODS AND SYSTEMS FOR MANAGING ASYNCHRONOUS FUNCTION CALLS

(71) Applicant: Meta Platforms Technologies, LLC, Menlo Park, CA (US)

(72) Inventor: Bernhard Poess, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 325 days.

(21) Appl. No.: 16/698,451

(22) Filed: Nov. 27, 2019

(51) Int. Cl.
*G06F 9/46* (2006.01)
*G06F 9/48* (2006.01)
*G06F 9/52* (2006.01)
*G06F 9/38* (2018.01)

(52) U.S. Cl.
CPC .......... *G06F 9/4881* (2013.01); *G06F 9/3871* (2013.01); *G06F 9/52* (2013.01)

(58) Field of Classification Search
None
See application file for complete search history.

(56) References Cited

U.S. PATENT DOCUMENTS

| | | | | |
|---|---|---|---|---|
| 6,728,959 B1 * | 4/2004 | Merkey | G06F 9/5088 | 718/107 |
| 7,178,145 B2 * | 2/2007 | Bono | G06F 9/5033 | 718/100 |
| 7,246,353 B2 * | 7/2007 | Forin | G06F 9/485 | 718/100 |
| 7,631,307 B2 * | 12/2009 | Wang | G06F 9/3009 | 712/228 |
| 7,647,483 B2 * | 1/2010 | Bates | G06F 9/4881 | 712/228 |
| 7,676,660 B2 * | 3/2010 | Kissell | G06F 8/4442 | 712/220 |
| 7,716,668 B2 * | 5/2010 | Moore | G06F 9/4881 | 718/103 |
| 7,979,680 B2 * | 7/2011 | Bates | G06F 9/463 | 712/228 |
| 8,359,595 B2 * | 1/2013 | Kaier | G06F 9/4843 | 718/103 |
| 8,375,389 B2 * | 2/2013 | Allen | G06F 9/4881 | 718/107 |
| 8,505,012 B2 * | 8/2013 | Moore | G06F 9/4881 | 718/103 |
| 9,396,007 B2 * | 7/2016 | Adams | G06F 12/0891 | |
| 9,880,943 B2 * | 1/2018 | Adams | G06F 9/4881 | |
| 10,311,151 B2 * | 6/2019 | Tabaaloute | G06F 16/289 | |
| 10,558,489 B2 * | 2/2020 | Ashkar | G06F 9/485 | |

(Continued)

*Primary Examiner* — Van H Nguyen
(74) *Attorney, Agent, or Firm* — Baker Botts L.L.P.

(57) ABSTRACT

This disclosure generally relates to operating systems and methods of computing devices for managing system and function calls. An example method include determining that a fiber is requesting to wait for one or more results of an asynchronous function call, pausing execution of the fiber until the one or more results are completed, enqueuing the paused fiber in a local queue of the one or more results, determining that the one or more results are completed, accessing one or more queued fibers in the local queue of the one or more results. The one or more queued fibers comprise the fiber and resuming execution of the one or more queued fibers, and the asynchronous function call is called by a thread to execute a task without being blocked while the task is being completed.

20 Claims, 4 Drawing Sheets

(56) References Cited

U.S. PATENT DOCUMENTS

| | | | |
|---|---|---|---|
| 11,029,968 B1* | 6/2021 | Klee | G06F 9/4812 |
| 11,068,305 B2* | 7/2021 | Brewer | G06F 9/30043 |
| 2005/0188177 A1* | 8/2005 | Gao | G06F 9/3851 |
| | | | 712/1 |
| 2019/0340020 A1* | 11/2019 | Brewer | G06F 9/3009 |

* cited by examiner

FIG. 4

METHODS AND SYSTEMS FOR MANAGING ASYNCHRONOUS FUNCTION CALLS

TECHNICAL FIELD

This disclosure generally relates to an operating system of computing devices, and in particular, is related to managing system and function calls.

BACKGROUND

Certain kernels can enhance the responsiveness of applications by using asynchronous (async) functions, which may provide opportunities to execute other code while waiting for asynchronous tasks to complete. For example, when a fiber, an execution unit in the async function, calls an asynchronous function, it may need to wait for the result of the function before it can perform the next operation. The future is a potential value, or error, that may be available at some time in the future. The fiber may need to call an async function and wait until the future is completed before the fiber can resume operations. In certain systems, when a fiber waits for a future, the fiber will be put onto a global queue (e.g., in L2 cache or memory) and be resumed in first-in, first-out order. Such memory access can be slow and consume an excessive amount of power. For example, after a future is processed and ready, the future may nevertheless be pushed out of L1 cache into L2 cache or even memory before the fibers that are waiting for it are resumed (e.g., due to other fibers that are positioned earlier in the queue).

SUMMARY OF PARTICULAR EMBODIMENTS

The purpose and advantages of the disclosed subject matter will be set forth in the description that follows. Additional advantages of the disclosed subject matter will be realized and attained by the methods and systems particularly pointed out in the written description and claims, as well as from the appended drawings.

Embodiments of the invention may include or be implemented in conjunction with an operating system. An operating system can be system software that can manage computer hardware and software resources and provide common services for computer processes. In certain embodiments, the disclosed subject matter can provide systems and methods to enhance the efficiency of an operating system by using system or function calls. In particular, the disclosed systems and methods can improve the responsiveness of applications and cache locality by using asynchronous functions and minimizing the usage of L2 cache and memory. For example, the subject matter provides an example method, by an operating system executing on a computing device, comprising determining that a first fiber/work item is requesting to wait for one or more results of an asynchronous function call, pausing execution of the first fiber/work until the one or more results are completed, enqueuing the paused first fiber/work in a local queue of the one or more results, determining that the one or more results are completed, accessing one or more queued fibers/work items in the local queue of the one or more results, wherein the one or more queued fibers/work items comprise the first fiber/work, and resuming execution of the one or more queued fibers/work items. A fiber, a unit of execution in a runtime, can call an asynchronous function to execute other codes while waiting for asynchronous tasks to complete the work items. The one or more queued fibers/work items can include a second fiber whose execution can be paused until the one or more results are completed.

In certain embodiments, the disclosed method can further include enqueuing the one or more queued fibers/work items on an execution queue of a thread. The resuming execution of the one or more queued fibers/work items can be performed by the thread. The disclosed method can also include selecting at least one executable fiber/work item from the execution queue or a global queue based on a priority policy, wherein the execution queue has a higher priority than the global queue. In non-limiting embodiments, the disclosed method can also include accessing one or more work items in the second local queue of the one or more results and resuming execution of the one or more work items. The disclosed method can reduce the usage of a global queue (e.g., L2 cache and memory) during managing asynchronous functions by storing queues/work items on an execution queue of a thread (e.g., local queue), which can result in an improved cache locality. The improved cache locality can reduce power consumption and increase the processing speed of a computing device.

In certain embodiments, the disclosed subject matter provides one or more computer-readable non-transitory storage media embodying software that is operable when executed to determine that a first fiber is requesting to wait for one or more results of an asynchronous function call, pause execution of the first fiber until the one or more results are completed, enqueue the paused first fiber in a local queue of the one or more results, determine that the one or more results are completed, access one or more queued fibers in the local queue of the one or more results, wherein the one or more queued fibers comprise the first fiber, and resume execution of the one or more queued fibers. The one or more queued fibers can further include a second fiber whose execution can be paused until the one or more results are completed. The one or more results can be associated with a second local queue configured to store work items that are waiting for the one or more results to complete. In non-limiting embodiments, the media is further configured to enqueue the one or more queued fibers on an execution queue of a thread, wherein the resuming execution of the one or more queued fibers is performed by the thread. In some embodiments, the media is also configured to select at least one executable fiber from the execution queue or a global queue based on a priority policy. The execution queue can have a higher priority than the global queue. In certain embodiments, the media is further configured to access one or more work items in the second local queue of the one or more results in response to determining that the one or more results are completed and resume execution of the one or more work items.

In certain embodiments, the disclosed subject matter provides a system comprising one or more processors, and one or more computer-readable non-transitory storage media coupled to one or more of the processors. The system comprises instructions operable when executed by one or more of the processors to determine that a first fiber is requesting to wait for one or more results of an asynchronous function call, pause execution of the first fiber until the one or more results are completed, enqueue the paused first fiber in a local queue of the one or more results, determine that the one or more results are completed, access one or more queued fibers in the local queue of the one or more results, wherein the one or more queued fibers comprise the first fiber, and resume execution of the one or more queued fibers. The one or more queued fibers can further include a second fiber whose execution can be paused until the one or more results are completed. The one or more results can be associated with a second local queue configured to store work items that are waiting for the one or more results to complete. In non-limiting embodiments, the system is further configured to enqueue the one or more queued fibers on an execution queue of a thread, wherein the resuming execution of the one or more queued fibers is performed by the thread. In some embodiments, the system is also configured to select at least one executable fiber from the execution queue or a global queue based on a priority policy. The execution queue can have a higher priority than the global queue. In certain embodiments, the media is further configured to access one or more work items in the second local queue of the one or more results in response to determining that the one or more results are completed and resume execution of the one or more work items.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

An operating system is system software that can manage computer hardware and software resources and provide services for computer processes. A kernel is a software-based program used by an operating system of a computing device to connect software applications running on the computing device to the underlying hardware. The kernel may be one of the first programs loaded on start-up. The kernel may handle the rest of start-up as well as input/output requests from processes, translating the requests into data-processing instructions for the central processing unit. The kernel may also perform its tasks, such as running processes, managing hardware devices, and handling interrupts, in this protected kernel space. A process may make a request of the kernel by calling a system call or a function call. For example, a kernel of an operating system may process system or function calls from a plurality of threads. A system call is a way for programs to interact with the operating system. A computer program makes a system call when it makes a request to the operating system's kernel. System calls can be used for hardware services, to create or execute a process, and for communicating with kernel services, including application and process scheduling. A function call can be a request made by a program or script that performs a predetermined function. A function call can be a subroutine call which can be a part of a larger program that is responsible for carrying out a specific task. The larger program may execute a heavy workload, and the function call may be performing a simple task, which can be also independent of the remaining program coding. When a function is called, the processor may go to where the code for the function is residing and execute the instructions of the function. Certain kernels can enhance the responsiveness of applications by using asynchronous (async) functions, which provide opportunities to execute other code while waiting for asynchronous tasks to complete.

Figure 1:
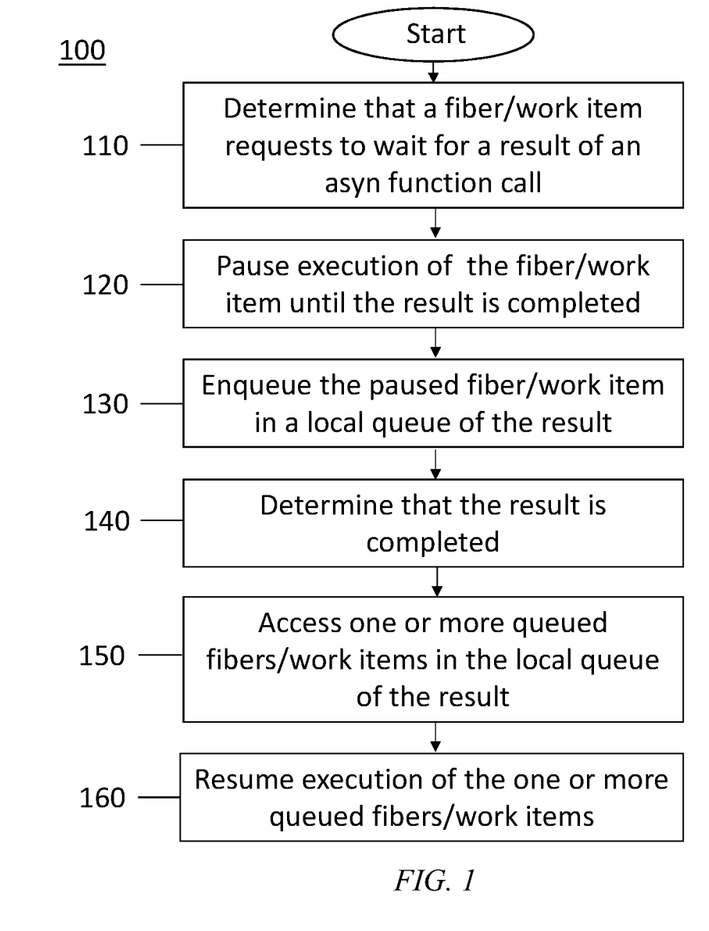
FIG. 1 illustrates an example method for managing an asynchronous function call.

The disclosed subject matter provides methods and systems for handling calls with improved cache locality and processing speed. FIG. 1 illustrates a flow diagram according to certain embodiments. In particular, FIG. 1 illustrates an example method 100 for managing an asynchronous call. The method may begin at step 110, where an operating system executing on a computing device can determine that a first fiber is requesting to wait for one or more results of an asynchronous function call. A fiber, a unit of execution in a runtime, can call an asynchronous function to execute other codes while waiting for asynchronous tasks to complete. Fibers can function as lightweight threads. For example, fibers can correspond to the Communicating Sequential Processes (CSP) abstraction and the mapping of fibers to threads can be a hybrid threading (i.e., M:N threading). Queues can use fibers to execute work items. A work item can block while executing inside a fiber. In non-limiting embodiments, blocking inside a fiber can be performed without blocking the thread currently executing the fiber. Instead, a dispatch event can be caused to another fiber (if no runnable fiber exists, a new fiber can be created) for the queue and the queue can continue to process work items on the fiber. In certain embodiments, if a call needs to defer processing, it may use completion to communicate the results of the operation. Completions are events that can be delivered via packets to a specified port.

At step 120, the operating system can pause execution of the first fiber until the one or more results are completed. When a fiber calls an asynchronous function, it may need to wait for the result of the function ("future") before it can perform the next operation. The future is a potential value or error that will be available at some time in the future. The future can be an object/container that contains a list of fibers and/or a list of work items that are waiting for the completion of the future. A future can be considered completed when the corresponding results have occurred. A future can be considered not completed when the corresponding asynchronous result has not occurred yet. In certain embodiments, an implicit future can be used as an ordinary value (i.e., a value obtained by referencing the ordinary value). In non-limiting embodiments, an explicit future, which requires a function call to obtain its value, also can be used for handling calls. In particular embodiments, explicit futures (e.g., value extraction, resolution, etc.) may be used in a runtime written in C. In non-limiting embodiments, the disclosed operating system can include futures which can support various operations (e.g., await, flat_map, and complete) for managing asynchronous functions.

In some embodiments, the fiber may need to call "await (Future)" and wait until the future is completed before the fiber can resume operations for asynchronous functions calls. The await operation can block the current fiber and returns to the event loop. Once the future completes, the runtime can make the fiber runnable again and returns to the caller of the await operation. If a future is already completed when the await function is called, the future can immediately return to the caller with minimal processing overhead.

Alternatively, a work item can be chained to the future by a "flat_map" operation. Under the flat_map operation, the work item can be processed when the future is completed. The results of the flat_map operation can be a future representing the asynchronous results of the work item.

In certain embodiments, a "complete" operation can write the result of asynchronous functions into a future. If a future is completed with a return code (e.g., XR_OK), any fiber waiting for the future or any work items chained to the future can be scheduled. If the completion return code is an error, all chained work items can be canceled.

In certain embodiments, the disclosed operating system can include futures which can support additional operations (e.g., await_all, await_some, flat_map_all, and flat_map_some) for managing asynchronous functions. For example, under the await_all operation, an array of futures can be considered as an input, and work items may wait for all of the futures to complete. Under the await_some operation, an array of futures can be considered as an input, and work items may wait for a specified number of the futures to complete. Under the flat_map all operation, an array of futures can be considered as an input. Once all of the futures complete, the chained work item may be processed. Under the flat_map some operations, an array of futures can be considered as an input. Once a specified number of the futures completes, the chained work item may be processed.

In certain embodiments, the work items can complete with an error code (e.g., on-error). Futures can be canceled or can time out with the error code. For example, a caller can register the on_error work item. If a future returns an error, cancels, or times out, the work item may be passed the error code. If the future is already canceled, the work item may be processed.

At step 130, the operating system can enqueue the paused first fiber in a local queue of the one or more results. A queue can be an abstract data type which can manage the execution of work items. A queue can process work items as they are dispatched onto the queue. The queue can use fibers provided by the runtime to execute work items. Each queue can have an associated port that the queue uses to receive events. Each queue can have an associated set of scheduling constraints around priority or time constraints. The runtime can automatically propagate constraints to the threads executing fibers of a queue and to the port associated with the queue.

In certain embodiments, each queue can have one set of constraints and work items are processed in a first-in, first-out (FIFO) order within a queue. When a program includes different workloads, each with a different set of constraints, the workloads with a different set of constraints can be modeled using multiple queues. For example, when a driver may want to do certain interrupt processing with a higher priority, the operating system can have one or more high priority queues for interrupt processing and one or more queues for processing lower priority work deferred from the interrupt processing.

In certain embodiments, a work item/fiber can encapsulate work that can be performed. The work item/fiber can include a callback and a reference to a context for the callback. Work items/fibers can be scheduled onto a queue in the system through the enqueue method. Enqueue operation can create a future that completes the result of the work item.

In certain embodiments, a fiber and/or a work item can be enqueued in a local queue. The local queue can a member of future objects and allow the disclosed operating system to track which work fibers are waiting for the future to complete. For example, future.getQueuedFibers( ) can return all the fibers that are waiting for the future. Similarly, the future can also store a list of work items waiting for it. Furthermore, future.getQueuedWorkItems can return all the work items. In certain embodiments, a fiber and/or a work item can be enqueued in one or more local queues. For example, additional local queues (e.g., second local queue), which are associated with one or more results, can store fibers or work items that are waiting for the one or more results to complete.

At step 140, the operating system can determine that the one or more results are completed. The operating system can perform the determination step using an event and a completion operation. The event can be asynchronous occurrence and have a source such as an interrupt, a message arriving on a channel, etc. An event can be signaled to a process through a packet which describes the event. An event can be called a completion when the event signals that an async operation has finished executing. Completions contain a key that identifies the completed operation. The disclosed operating system provides various operations (e.g., on_event and on_completion) for the events and completions. The on_event operation can allow the caller to chain a work item to a given event. The event can be identified through its source. If multiple work items are chained to a given event, all work items can be processed. Certain events can be idempotent. When registering for an event, a caller may specify that this event is idempotent to them. The runtime can use this flag to optimize calls to the callback for multiple events. The on_completion operation can connect a future with a completion event. When the future completes, the result of the future can point to the event content of the completion.

In certain embodiments, the disclosed operating system with asynchronous operations can cancel chains of operations during handling asynchronous functions. The disclosed operating system can provide two methods (e.g., cancel and on_error) to cancel the operation.

The cancel operation can operate on a future and cancel the asynchronous operation attached to the future as well as all futures (and as consequence operations) chained to the future. Under the cancel operations, a work item attached to a future may not be preempted if it is currently processing. Work items that are not processing may be canceled. If a work item attempts to complete a canceled future, an error code can be returned indicating the cancellation. If the future is already canceled, the cancel operation can be idempotent. If the future is already completed, the cancel operation can silently return but the future cannot get canceled. If a cancel operation is successful and a work item is registered for errors on a future, the work item can be processed and passed in the cancellation error code. The cancel operation can return true canceled futures.

At step 150, the operating system can access one or more queued fibers in the local queue of the one or more results, wherein the one or more queued fibers comprise the first fiber. In certain embodiments, the one or more queued fibers can further include additional fibers whose execution can be paused until the one or more results are completed. In response to determining that the one or more results are completed, the operating system can access to the one or more queued fibers/work items in the one or more local queues of the one or more results. At step 160, execution of the one or more queued fibers/work items can be resumed.

Figure 2:
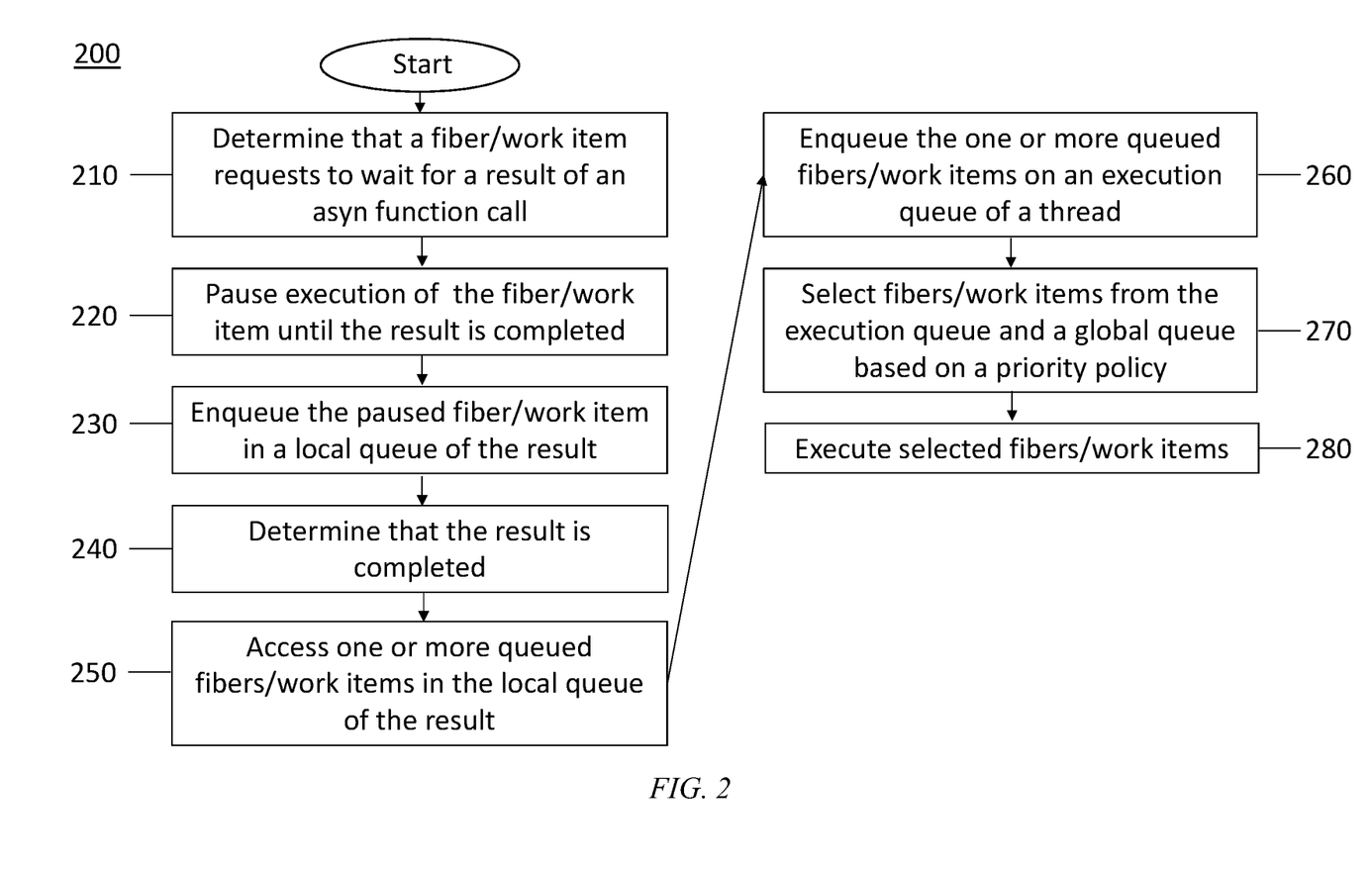
FIG. 2 illustrates an example method for managing an asynchronous function call using an execution queue according to certain embodiments.

The disclosed operating system can further perform additional steps for handling calls with improved power consumption and cache locality of a computing system. FIG. 2 illustrates an example method 200 for handling asynchronous functions with improved power consumption and cache locality. The example illustrated in FIG. 2 can be a continuation of the example illustrated in FIG. 1. As an example and not by way of limitation, an operating system executing on a computing device can determine that a first fiber is requesting to wait for one or more results of an asynchronous function call at step 210. At step 220, the operating system can pause execution of the first fiber until the one or more results are completed. At step 230, the operating system can enqueue the paused first fiber in a local queue of the one or more results. At step 240, the operating system can determine that the one or more results are completed. At step 250, the operating system can access one or more queued fibers in the local queue of the one or more results, wherein the one or more queued fibers comprise the first fiber.

In certain embodiments, the disclosed operating system can further enqueue the one or more queued fibers/work items on an execution queue (i.e., hotlist) of a thread at step 260. A thread can be a sequence of programmed instructions that can be managed by a scheduler. The scheduler can be a part of the disclosed operating system. An asynchronous runtime can manage threads and map fibers onto the threads dynamically. The thread also can process work items submitted to a queue. In non-limiting embodiments, the disclosed operating system can selectively enqueue the one or more queued fibers/work items in either an execution queue of a thread or a global queue. For example, after a predetermined number of fibers/work items are enqueued on the hotlist, additional fibers/work items may be enqueued in a global queue. In some embodiments, the disclosed operating system can specify which fibers/work items can be enqueued on the hotlist.

At step 270, the disclosed operating system can select at least one queued fiber/work item for execution from the execution queue or a global queue based on a priority policy. For example, when the future is complete, the disclosed operating system may put the queued fibers/work items on the hotlist. The operating system's scheduler can go through its execution queue to see how to schedule fibers/work items to use the CPU. The hotlist can allow the scheduler of the operating system to prioritize and batch the fibers/work items on the hotlist. In non-limiting embodiments, the scheduler can perform based on a set of constraints. The constraints can be priority policy-based constraints. An application models its workload in the form of several queues. Each queue has different priority constraints such as interactive, background, or long running corresponding to the different workloads. In some embodiments, the disclosed operating system can manage the thread pool for each queue automatically but meet the agreed upon constraints. For example, the disclosed operating system can select at least one executable fiber/work item from the execution queue based on a priority policy. The execution queue may have a higher priority than the global queue, and the operating system's scheduler can prioritize the execution of the fiber/work item from the execution queue higher than other queues. Certain fibers/work items can be stored in global queues. For example, when a future including fibers/work items is processed and ready, the future may be pushed out of L1 cache into L2 cache or even memory before the fibers that are waiting for it are resumed. The disclosed operating system can execute the fibers/work items earlier in the hotlist in order of priority and sequentially execute fibers/work items in global queues at step 280. The resuming execution of the one or more queued fibers/work items at step 280 may be performed by the thread.

In certain embodiments, the constraints can be time-based constraints such as deadlines and wake up latency (slack) for events. The disclosed operating system can provide various operations for the time-based constraint (e.g., create_timer and sleep). The create_timer operation can create a timer that can trigger after a specified duration has elapsed. Allowed slack for delivering a timer can be derived from the constraints configured for the queue that the timer is created for. Work items scheduled from timers can be processed with work items scheduled from other events. The create_timer operation can create a future that can be completed with the result of the work item processed when the timer fires. Execution of certain fibers/work items can be paused for a predetermined duration using the sleep operation. The sleep operation can synchronously block the fibers/work items for at least the given duration. The slack allowed for waking up from the block can be derived from the constraints configured for the queue that is being processed at the time.

In certain embodiments, the disclosed operating system can use more than one thread to handle asynchronous function calls. For example, an application can use a queue with a managed thread pool with more than one thread. When a queue is backed by more than one thread or work items from multiple queues access shared data, the access to the shared data can be protected in a critical section. The work items in the queue can contain a critical section that is protected against other work items accessing the same section concurrently through another thread in the queue's thread pool. Similarly, when multiple queues are used, a critical section in the work item can be protected against other work items processed in a different queue. To protect the critical section, the disclosed operating system can provide various operations (e.g., mutex, condition and semaphore).

Particular embodiments may repeat one or more steps of the methods of FIGS. 1 and 2, where appropriate. Although this disclosure describes and illustrates particular steps of the methods of FIGS. 1 and 2 as occurring in a particular order, this disclosure contemplates any suitable steps of the methods of FIGS. 1 and 2 occurring in any suitable order. Moreover, although this disclosure describes and illustrates an example method for managing an asynchronous call including the particular steps of the methods of FIGS. 1 and 2, this disclosure contemplates any suitable method for managing an asynchronous call including any suitable steps, which may include all, some, or none of the steps of the methods of FIGS. 1 and 2, where appropriate. Furthermore, although this disclosure describes and illustrates particular components, devices, or systems carrying out particular steps of the methods of FIGS. 1 and 2, this disclosure contemplates any suitable combination of any suitable components, devices, or systems carrying out any suitable steps of the methods of FIGS. 1 and 2.

Figure 3:
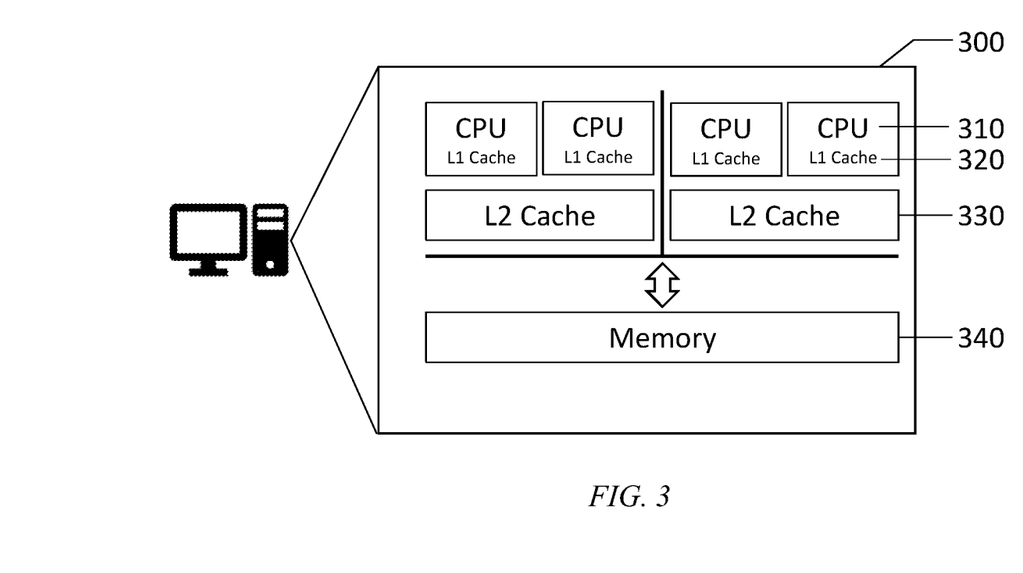
FIG. 3 illustrates an example computer system with an improved cache locality.

FIG. 3 illustrates an example computer system with an asynchronous runtime according to certain embodiments. In particular embodiments, FIG. 3 illustrates a multi-core architecture 300 including an operating system, one or more CPUs 310, L1 320/L2 caches 330, memory 340, or any other processor or hardware included within the computing device. In particular embodiments, methods 100 and 200 may be performed by the operating system. The operating system can improve cache locality during managing asynchronous functions. In certain systems managing asynchronous functions, a future including fibers/work items may be pushed out of L1 cache 320 into L2 cache 330 or even memory 340. Accessing to the L2 cache or memory can decrease processing speed and increase power consumption. The disclosed operating system 301 can reduce the usage of a global queue (e.g., L2 cache and memory) during managing asynchronous functions by storing queues/work items on an execution queue of a thread (e.g., local queue), which can result in an improved cache locality. The improved cache locality can reduce power consumption and increase the processing speed of a computing device.

In certain embodiments, the disclosed computing device can improve the responsiveness of applications by using asynchronous functions, which can be allowed to execute other code while waiting for asynchronous tasks to complete. For example, the asynchronous functions can be used for processing IPC messages (e.g., a service can wait for IPC messages on a set of channels), processing interruptions (e.g., when a driver receives interrupt events from the system on a port, the driver can perform a reduced amount of processing for each interrupt event in a queue that has high priority and then defer work to another queue with lower priority), processing events (e.g., debugger attached to a process can process events such as "thread created" or "thread suspended" that it receives via a port, and a process can perform on-demand loading of pages for an address space region of another process, which can process pagefault events from the remote process that it receives via a port), canceling an IO (e.g., an application can issue multiple reads to a file. Before the reads complete, the application can decide whether the reads are necessary and close the file. The file library can turn around and cancels the in-flight IO), setting timers (e.g., an application can wait for a predetermined time to process a work item), setting priority constraints (e.g., each queue can assign different priority constraints such as interactive, background, or long running time corresponding to the different workloads. A system can manage the thread pool for each queue, automatically meeting the agreed upon constraints), and waiting for a set of asynchronous operations to complete (e.g., an application can issue several IO requests and then synchronously wait for all or some of them to complete).

In certain embodiments, the disclosed computing device can include an operating system which can manage memory that can be used across work items through explicit reference counts. For example, when a reference to a managed object is stored, the caller can retain a reference count on the object. Once the reference count drops to zero, the caller can be freed. The disclosed operating system can use a reference count to manage the lifetime of an object. When an object reference is passed across an asynchronous boundary (e.g., read between work items), it can be retained through an acquire operation. For example, when a work item has finished using an object, the work item can release the object. The release of the object can cause the object's reference count to drop to zero, and the object can be freed. In non-limiting embodiments, the disclosed operating system can manage memory that can be used across work items through a form of scope bound memory management (SBRM) that operates at the work item scope. For example, any objects created while a work item is processing can be released after the work item exits. The disclosed operating system can automatically acquire references when a future is retained or when an object is passed to a work item as a context. The objects can be released when the work item finishes processing or a cancelation event occurs.

Figure 4:
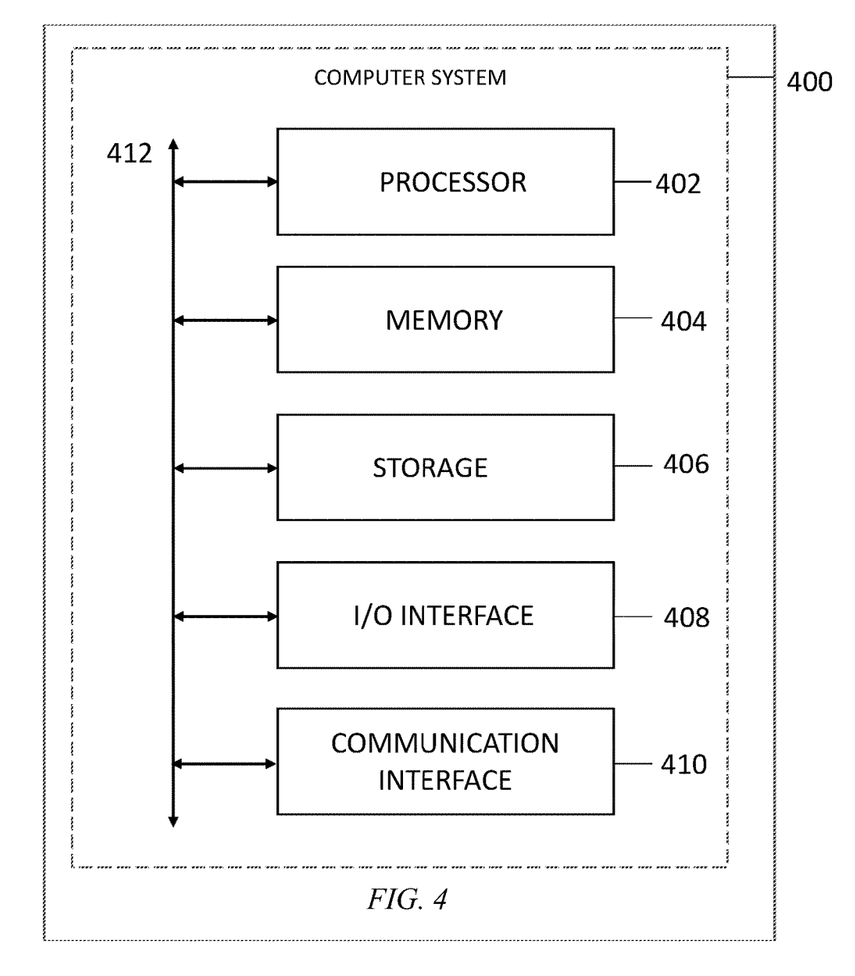
FIG. 4 illustrates an example computer system.

FIG. 4 illustrates an example computer system 400 with an asynchronous runtime according to certain embodiments. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides the functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real-time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an operating system executing on a computing device:
   determining that a first fiber is requesting to wait for a future associated with one or more results generated by an asynchronous function call, wherein the asynchronous function call is called by a thread to execute a task without being blocked while the task is being completed;
   pausing execution of the first fiber until the future is completed, wherein the future is completed when the asynchronous function call generates the one or more results;
   enqueuing the paused first fiber in a local queue associated with the future that the first fiber is waiting for;
   determining that the future is completed;
   accessing one or more queued fibers in the local queue of the future, wherein the one or more queued fibers comprise the first fiber;
   prioritizing execution of the one or more queued fibers in the local queue over fibers in a global queue based on a priority policy;
   resuming execution of the one or more queued fibers.

2. The method of claim 1, wherein the one or more queued fibers further comprise a second fiber whose execution is paused until the one or more results are completed.

3. The method of claim 1, further comprising:
   enqueuing the one or more queued fibers on an execution queue of a thread;
   wherein the resuming execution of the one or more queued fibers is performed by the thread.

4. The method of claim 3, further comprising:
   selecting at least one executable fiber from the execution queue or the global queue based on the priority policy, wherein the execution queue has a higher priority than the global queue.

5. The method of claim 1, wherein the one or more results are associated with a second local queue configured to store work items that are waiting for the one or more results to complete.

6. The method of claim 5, further comprising:
   in response to determining that the one or more results are completed, accessing one or more work items in the second local queue of the one or more results; and
   resuming execution of the one or more work items.

7. The method of claim 6, further comprising:
   enqueuing the one or more work items on an execution queue of a thread;
   wherein the resuming execution of the one or more queued work items is performed by the thread.

8. The method of claim 7, further comprising:
   selecting at least one work item for execution from the execution queue or the global queue based on the priority policy, wherein the execution queue has a higher priority than the global queue.

9. One or more computer-readable non-transitory storage media embodying software that is operable when executed to:
- determine that a first fiber is requesting to wait for one or more results of an asynchronous function call, wherein the asynchronous function call is called by a thread to execute a task without being blocked while the task is being completed;
- pause execution of the first fiber until the one or more results are completed;
- enqueue the paused first fiber in a local queue associated with the one or more results that the first fiber is waiting for;
- determine that the one or more results are completed;
- access one or more queued fibers in the local queue of the one or more results, wherein the one or more queued fibers comprise the first fiber;
- prioritizing execution of the one or more queued fibers in the local queue over fibers in a global queue based on a priority policy; and
- resume execution of the one or more queued fibers.

10. The media of claim 9, wherein the one or more queued fibers further comprise a second fiber whose execution is paused until the one or more results are completed.

11. The media of claim 9, wherein the media is configured to: enqueue the one or more queued fibers on an execution queue of a thread;
- wherein the resuming execution of the one or more queued fibers is performed by the thread.

12. The media of claim 11, wherein the media is configured to:
- select at least one executable fiber from the execution queue or the global queue based on the priority policy, wherein the execution queue has a higher priority than the global queue.

13. The media of claim 9, wherein the one or more results are associated with a second local queue configured to store work items that are waiting for the one or more results to complete.

14. The media of claim 13, wherein the media is configured to:
- in response to determining that the one or more results are completed, access one or more work items in the second local queue of the one or more results; and
- resume execution of the one or more work items.

15. The media of claim 14, wherein the media is configured to:
- enqueue the one or more work items on an execution queue of a thread;
- wherein the resuming execution of the one or more queued work items is performed by the thread.

16. The media of claim 15, wherein the media is configured to:
- select at least one work item for execution from the execution queue or the global queue based on the priority policy, wherein the execution queue has a higher priority than the global queue.

17. A system comprising:
- one or more processors; and
- one or more computer-readable non-transitory storage media coupled to one or more of the processors and comprising instructions operable when executed by one or more of the processors to cause the system to:
- determine that a first fiber/work item is requesting to wait for one or more results of an asynchronous function call, wherein the asynchronous function call is called by a thread to execute a task without being blocked while the task is being completed;
- pause execution of the first fiber/work item until the one or more results are completed;
- enqueue the paused first fiber/work item in a local queue associated with the one or more results that the first fiber is waiting for;
- determine that the one or more results are completed;
- access one or more queued fibers/works item in the local queue of the one or more results, wherein the one or more queued fibers/work items comprise the first fiber/work item;
- prioritizing execution of the one or more queued fibers in the local queue over fibers in a global queue based on a priority policy; and
- resume execution of the one or more queued fibers/work items.

18. The system of claim 17, wherein the one or more queued fibers/work items further comprise a second fiber/work item whose execution is paused until the one or more results are completed.

19. The system of claim 17, wherein the system is configured to:
- enqueue the one or more queued fibers/work items on an execution queue of a thread;
- wherein the resuming execution of the one or more queued fibers/work items is performed by the thread.

20. The system of claim 19, wherein the system is configured to:
- select at least one executable fiber/work item from the execution queue or the global queue based on the priority policy, wherein the execution queue has a higher priority than the global queue.

* * * * *